United States Patent [19]

Earle

[11] 4,048,459
[45] Sept. 13, 1977

[54] METHOD OF AND MEANS FOR MAKING A METALIC BOND TO POWDERED METAL PARTS

[75] Inventor: Michael Earle, Mapleton, Ill.

[73] Assignee: Caterpillar Tractor Co., Peoria, Ill.

[21] Appl. No.: 623,540

[22] Filed: Oct. 17, 1975

[51] Int. Cl.² .................. B23K 26/00; B23K 1/04
[52] U.S. Cl. ................... 219/85 BM; 219/76; 219/121 LM
[58] Field of Search .......... 219/76, 85 R, 85 M, 219/85 BA, 85 BM, 121 L, 121 LM, 137 R, 129, 149; 29/182, 182.1, 182.2

[56] References Cited

U.S. PATENT DOCUMENTS

| | | | |
|---|---|---|---|
| 2,198,254 | 4/1940 | Koehring | 29/182.1 |
| 2,927,990 | 3/1960 | Johnson | 219/76 |
| 3,250,842 | 5/1966 | Hikido | 219/121 L X |
| 3,534,462 | 10/1970 | Cruickshank et al. | 219/121 LM X |
| 3,626,140 | 12/1971 | Peyrot | 219/121 L X |
| 3,670,137 | 6/1972 | Inoue | 219/76 |
| 3,717,442 | 2/1973 | Knopp | 29/182.2 |
| 3,778,586 | 12/1973 | Breton et al. | 219/76 |
| 3,846,612 | 11/1974 | Augsburger | 219/121 LM |
| 3,900,593 | 8/1975 | Herczog et al. | 219/121 L X |

OTHER PUBLICATIONS

Industrial Electronics, "High-Power $CO_2$ Lasers in Industry", Sept., 1968, p. 359.

Primary Examiner—J. V. Truhe
Assistant Examiner—N. D. Herkamp
Attorney, Agent, or Firm—Phillips, Moore, Weissenberger, Lempio & Majestic

[57] ABSTRACT

A method of and means for making metallic bonds to powdered metal parts by brazing techniques is disclosed in which the braze material is heated to brazing temperature by a laser beam. Techniques for insuring a reliable bond without excessive absorption of braze material by the powdered metal parts are described.

6 Claims, 3 Drawing Figures

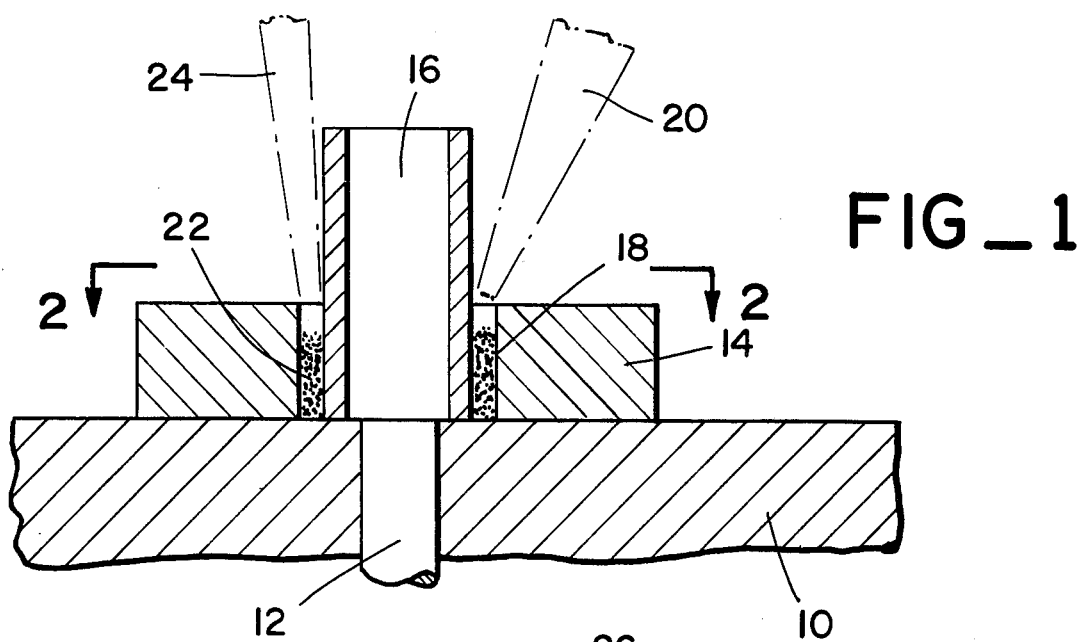
FIG_1
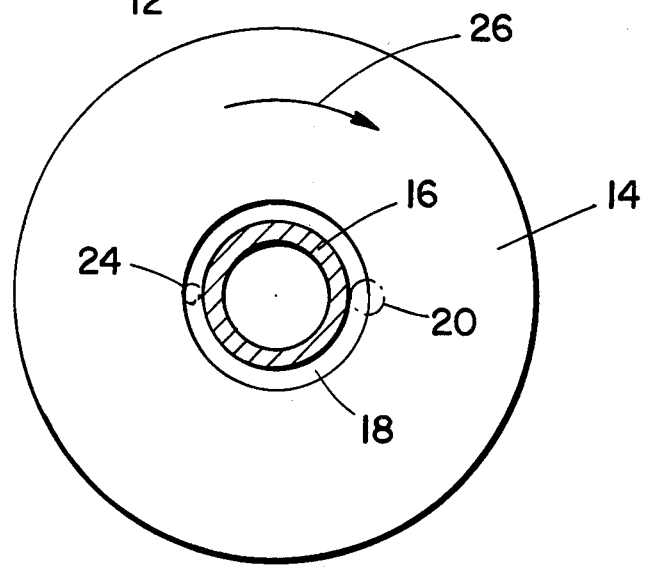
FIG_2
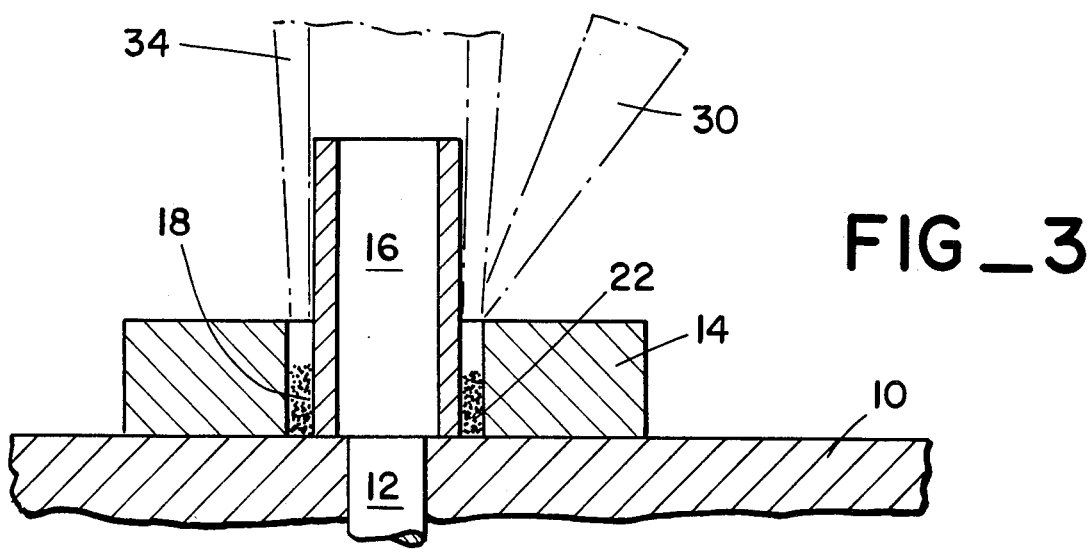
FIG_3

METHOD OF AND MEANS FOR MAKING A METALIC BOND TO POWDERED METAL PARTS

BACKGROUND OF THE INVENTION

This invention relates to a method of and means for making a metallic bond to powdered metal parts and more particularly to a method of and means for brazing to powdered metal parts through the use of a beam of coherent electromagnetic energy.

In recent years, it has been found advantageous to make metal parts for use in a wide variety of applications by compacting metal powders through the use of heat and pressure into solid bodies of the desired shape and size. Such parts made of compacted powdered metal can be designed to provide unusual physical characteristics, not obtainable with conventional alloying techniques, by selection of the metal powder or mixture of metal powders which are compacted to form the desired solid body.

However, powdered metal parts have the disadvantage that is has been difficult, if not impossible to make a metallic bond to such parts. Attempts to weld powdered metal parts to other metal parts have failed because of the heat required to raise a joint therebetween to the melting temperature of both parts in order to produce a satisfactory weld. Thus, the powdered metal parts may actually crumble or fall apart during or after the welding process because of internal stresses resulting from excessive heating.

Attempts to braze powdered metal parts to other parts have been only slightly less unsatisfactory due to the excessive absorption of the molten braze material into the powdered metal parts. In conventional processes of heating the braze material to its melting temperature, the powdered metal part is also heated. Although the temperatures involved in brazing are lower than the temperatures required for welding and weakening of the powdered metal parts thereby is correspondingly less, it has been found that such heating of the powdered metal parts will cause excessive amounts of the braze material to be drawn into or absorbed by the powdered metal parts by a capillary action which is a function of the temperature reached by the parts.

Thus, if sufficient heat is used to provide a satisfactory braze, an excessive amount of inherently expensive braze material will be required and it will be difficult to insure an even distribution of the braze material throughout the braze joint. In addition, the absorption of the braze material into the powdered metal parts will tend to change the desired physical characteristics of powdered metal parts at least in the vicinity of the braze joint and usually throughout a sufficient volume to defeat the purpose of using the powdered metal part.

It is a principal object of this invention to provide a method of and means for making metallic bonds to powdered metal parts without excessive change in the desired physical characteristics of the powdered metal parts or the use of excessive amounts of expensive materials.

SUMMARY OF THE INVENTION

Briefly, a metallic bond between a powdered metal part and another part is made according to this invention by placing the parts to be bonded in the desired close spaced juxtaposition and introducing into the space therebetween at a given time rate a quantity of brazing metal which melts at a lower temperature than the melting temperature of either the powdered metal parts or such other part. A beam of coherent electromagnetic energy is impinged on the quantity of metal in such space, such beam being fully received within such space and having a power density sufficient to melt the quantity of brazing metal impinged by such beam at the given time rate of introduction thereof without excessive heating of the powdered metal part.

BRIEF DESCRIPTION OF THE DRAWING

The foregoing object and other objects and features of this invention will be more fully understood from a reading of the following detailed description of preferred embodiments of the method and means of the subject invention in conjunction with the attached drawing wherein:

FIG. 1 is a cross-sectional side view in elevation of a preferred means for practicing the method of this invention according to one embodiment thereof;

FIG. 2 is a top view of the means of FIG. 1 taken along lines 2—2 of FIG. 1;

FIG. 3 is a cross-sectional side view in elevation of a preferred means for practicing the method of this invention according to another embodiment thereof.

DESCRIPTION OF PREFERRED EMBODIMENTS

Referring to FIG. 1, a means for practicing the teaching of this invention according to one embodiment thereof is shown in cross-sectional side elevation. Such means includes a turntable 10 mounted for rotation by or about an appropriate axle 12. As shown in FIG. 1, a powdered metal part 14 comprising an annular collar made of compacted metal particles is positioned on the turntable 10 with its axis coincident with the axis of rotation of the turntable 10 about the axle 12. Similarly, a tubular metal part 16 having an external diameter smaller than the internal diameter of the collar 14 is positioned coaxially within the collar 14 and with one end resting on the turntable 10. Thus, it will be seen that an annular volume 18 is defined between the inner peripheral surface of the collar 14 and the outer peripheral surface of the tubular metal part 16.

According to the teaching of this invention, a funnel member 20 is positioned above the turntable 10 with its restricted open end in appropriate juxtaposition to the annular volume 18 so that metal powder introduced into the funnel member 20 from a supply (not shown) will be directed into such annular volume 18. Similarly, a high power beam of coherent electromagnetic energy indicated by dotted lines 24 is directed into the annular volume 18 from a source (not shown) which is preferably a $CO_2$ laser capable of generating electromagnetic energy having a wavelength of 10.6 microns at power levels as high as 10 kilowatts. Such souce also includes appropriate focusing means for producing a convergent beam of electromagnetic energy as indicated by the dotted lines 24. According to the teaching of this invention, the powdered metal particles 22 introduced into the annular volume 18 are made of a brazing material having a melting point lower than the melting point of the tubular metal part 16 and more particularly lower than the melting point of the metal particles of which the powdered metal collar 14 is made.

Referring to FIG. 2, it will be seen that upon rotation of the turntable 10, the powdered metal collar 14 and the tubular metal part 16 will be rotated in the direction indicated by the arrow 26 about their common axis which is coincident with the axis of the axle 12 which mounts the turntable 10. Thus, metal particles introduced into the annular volume 18 by the funnel member 20 will be carried into position for impingement by the beam 24 of electromagnetic energy. According to the teaching of this invention, the time rate of introduction of the powdered brazed metal 22, the power density of the beam 24 of electromagnetic energy and the rate of rotation of the turntable are adjusted so that the powdered braze metal 22 will be melted by the beam 24 at a time rate substantially equal to the time rate of introduction thereof. It is an important aspect of this invention that the entire cross-section of the beam 24 at the plane of the upper surface of the collar 14 of powdered metal be fully received within the annular volume 18 and that no portion such beam impinge upon the upper surface of such powdered metal part 14. It is also an important aspect of this invention that the powdered braze metal 22 by melted without excessive heating of the powdered metal part 14. The temperature to which the powdered metal part 14 is raised in practicing the process of this invention may be adjusted by controlling the time rate of introduction of the powdered braze metal, the power density of the beam 24 of electromagnetic energy and the rate of rotation of the turntable 10.

It has been found that if the temperature of the powdered metal part is raised too high, then excessive amounts of braze material will be absorbed into the powdered metal part 14 by capillary action thus tending to increase the cost of the braze as well as tending to modify the physical characteristics of the powdered metal part 14. It is, of course, desirable to raise the temperature of the external surface of the tubular metal part 16 as well as the internal surface of the powdered metal part 14 to some extent in order to provide a satisfactory brazed joint therebetween. Thus, according to this invention, a portion of the beam 24 of electromagnetic energy may be allowed to impinge upon the external surface of the tubular metal part resulting in the desired heating thereof to insure a strong brazed bond to such surface. In general, the heat conducted to the powdered metal part 14 from the melted braze material will be sufficient to heat the internal surface of such powdered metal part 14 to a temperature sufficient to insure a sound brazed bond thereto.

Referring to FIG. 3, a means for practicing the method of this invention according to a different embodiment thereof is shown is cross-sectional side elevation. The embodiment of FIG. 3 differs from the embodiment of FIG. 1 in that an enlarged annular beam of electromagnetic energy as indicated by the dotted lines 34 is used in place of the generally pencil-like beam 24 of FIGS. 1 and 2. According to this embodiment of the invention, a funnel member 30 having the plane of its restricted opening extending at an angle to the axis of the funnel member must be used in order to avoid interference with the annular beam 34 of electromagnetic energy. Thus, the funnel member 30 is positioned as shown in FIG. 3 so that it is capable of introducing powdered braze metal into the annular volume 18 without projecting into the path of the beam 34 of electromagnetic energy.

According to the embodiment of this invention shown in FIG. 3, the annular beam 34 of electromagnetic energy is focused so that the internal diameter thereof is slightly greater than the external diameter of the tubular member 16 and the external diameter thereof is slightly smaller than the internal diameter of the annular powdered metal part 14 at the plane of the upper surface of such powdered metal part 14. Thus, the entire beam 34 of electromagnetic energy will be received within the annular volume 18 and will impinge on the powdered braze material introduced therein from the funnel member 30. If the dimensions of the powdered metal part 14 and metal part 16 are small enough, it may be possible to fill the annular volume 18 with powdered braze metal 22 and then impinge the beam 34 of electromagnetic energy thereon for a sufficient time to melt the entire quantity of powdered braze material 22 within the annular volume 18. However, where the dimensions of the powdered metal part 14 and metal part 16 are large, it may be necessary to only partially fill the annular volume 18 with powdered braze metal 22 before impinging the beam 34 of electromagnetic energy thereon in a pulse of sufficient duration to melt the powdered braze metal 22 which partially fills the volume 18. A sufficient time would be allowed between such pulse and the next pulse of the beam 34 of electromagnetic energy to allow a further partial filling of the annular volume 18 about the periphery of the metal member 16 at which time such further quantity of powdered braze metal 22 would be melted by a further pulse of the beam 34 and the process repeated until the annular volume 18 is filled.

The turntable 10 and axle 12 used according to the embodiment of FIG. 3 to rotate the annular powdered metal part 14 and tubular metal member 16 about their common axis is, of course, the same as described in connection with FIGS. 1 and 2. The turntable 10 may be made of an appropriate metal having good heat conduction properties in order to minimize any temperature rise which may tend to occur in the powdered metal part 14 due to an accumulation of heat therein during the process of melting the powdered braze metal 22. It would, of course, be possible to design an annular funnel member 30 so that powdered braze metal 22 could be introduced into the annular volume about the entire periphery of the metal part 16 simultaneously in which event, rotation of the parts would not be necessary. It would, of course, be necessary to properly adjust the time rate of introduction of the powdered braze metal 22 and the power density of the beam 34 of electromagnetic energy to obtain proper melting of the powdered braze metal 22 without excessive heating of the powdered metal part 14.

Although a tubular metal member 16 is shown in the drawing as described hereinabove, such metal part could be a solid rod or wire without affecting the method or means of this invention. Similarly, the part 16 could be made of powdered metal without affecting the teaching of this invention and, in fact, the teaching of this invention could be applied to the brazing of other than powdered metal parts to each other in place of conventional brazing techniques where it is desirable to accomplish such a braze without excessive heating of the metal parts.

It has been found that if the power density of the beam 34 of electromagnetic energy is too low, it will be difficult to make a good braze without excessive heating of the metal parts to be brazed, particularly where one of such metal parts is a powdered metal part. This is due to the fact that the time rate of introduction and melting of the powdered braze material will be to slow that heat will tend to accumulate in the powdered metal part raising the temperature thereof sufficiently to result in undesirable absorption of the braze material into the powdered metal part. Thus, according to the teaching of this invention, a relatively high power beam of electromagnetic energy having a power density greater than about 200 kilowatts per square inch must be used. Higher power densities may be used provided the time rate of introduction of the powdered braze metal and the time rate of melting such powdered braze metal are adjusted so as to be substantially equal, as described hereinabove.

It is believed that those skilled in the art will adapt the teaching of this invention to a wide variety of materials having a wide range of melting temperatures. It is also believed that those skilled in the art will apply the teaching of this invention to the brazing of metal parts and particularly to the brazing of powdered metal parts having a wide range of physical dimensions making appropriate obvious adaptations in the teaching of this invention to suit the specific application without departing from the spirit and scope of the subject invention.

What is claimed is:

1. The method of making a metallic bond between a powdered metal part and a second part comprising the steps of:
   a. positioning said powdered metal part in selected close spaced juxtaposition to said second part to provide a given space therebetween;
   b. introducing brazing metal powder which melts at a lower temperature than said powdered metal part and said second part into said given space between said parts at a given time rate; and
   c. impinging a beam of coherent electromagnetic energy on said brazing metal powder in said space, said beam being fully received within said space to fully melt said brazing metal powder at said given time rate and of such intensity and for such duration whereby deleterious brazing metal powder absorption by said powdered metal part is substantially minimized.

2. The method of claim 1 including the step of carrying out said step of introducing brazing metal powder and said step of impinging a beam of coherent electromagnetic energy thereon substantially simultaneously.

3. The method of claim 2 including the steps of carrying out said step of introducing brazing metal powder at a first location in said space between said parts, carrying out said step of impinging a beam of electromagnetic energy thereon at a second location in said space between said parts, and continuously moving said parts with respect to said first and second locations in a direction from said first location toward said second location.

4. The method of claim 1 including the step of carrying out said step of introducing brazing metal powder and said step of impinging a beam of coherent electromagnetic energy thereon in alternate increments of time.

5. The method of claim 4 including the step of continuing said step of introducing brazing metal powder until said space between said parts is substantially filled and subsequently carrying out said step of impinging a beam of electromagnetic energy thereon until all of said brazing metal powder in said space is melted.

6. The method of claim 1 wherein said step of impinging a beam of coherent electromagnetic energy on said brazing metal powder includes the step of maintaining a power density of greater than about 200 kilowatts per square inch at the impingement of said beam on said brazing metal powder.

* * * * *